Sept. 12, 1933.  W. J. MORGAN  1,926,955
BRAKE
Filed March 7, 1932  2 Sheets-Sheet 1
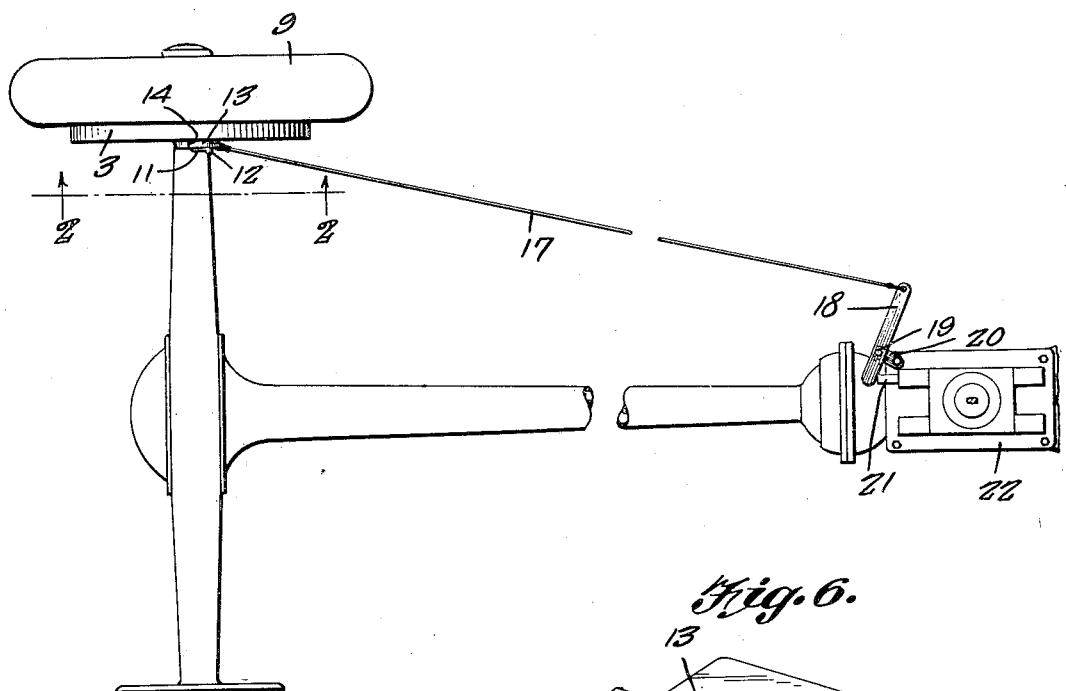
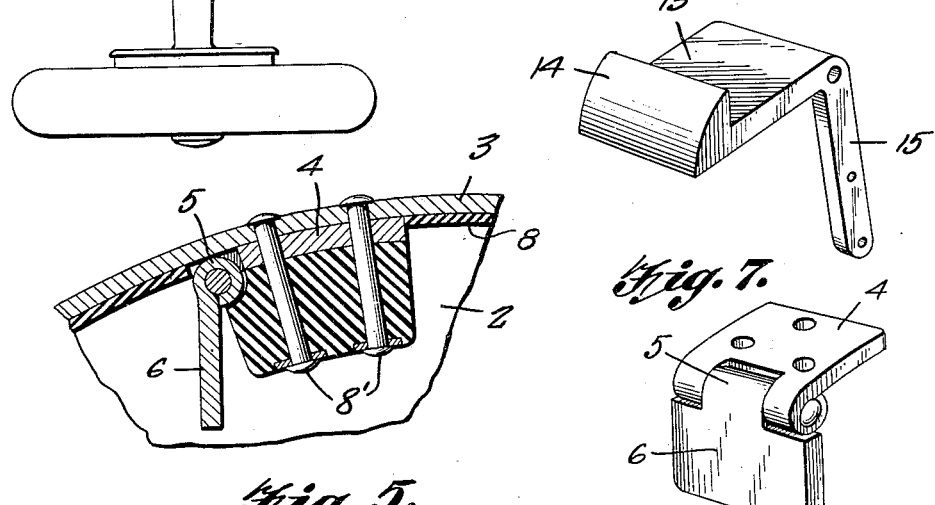
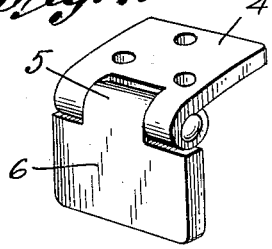
William J. Morgan,
INVENTOR
BY Victor J. Evans & Co.
ATTORNEY Sept. 12, 1933. W. J. MORGAN 1,926,955
BRAKE
Filed March 7, 1932 2 Sheets-Sheet 2
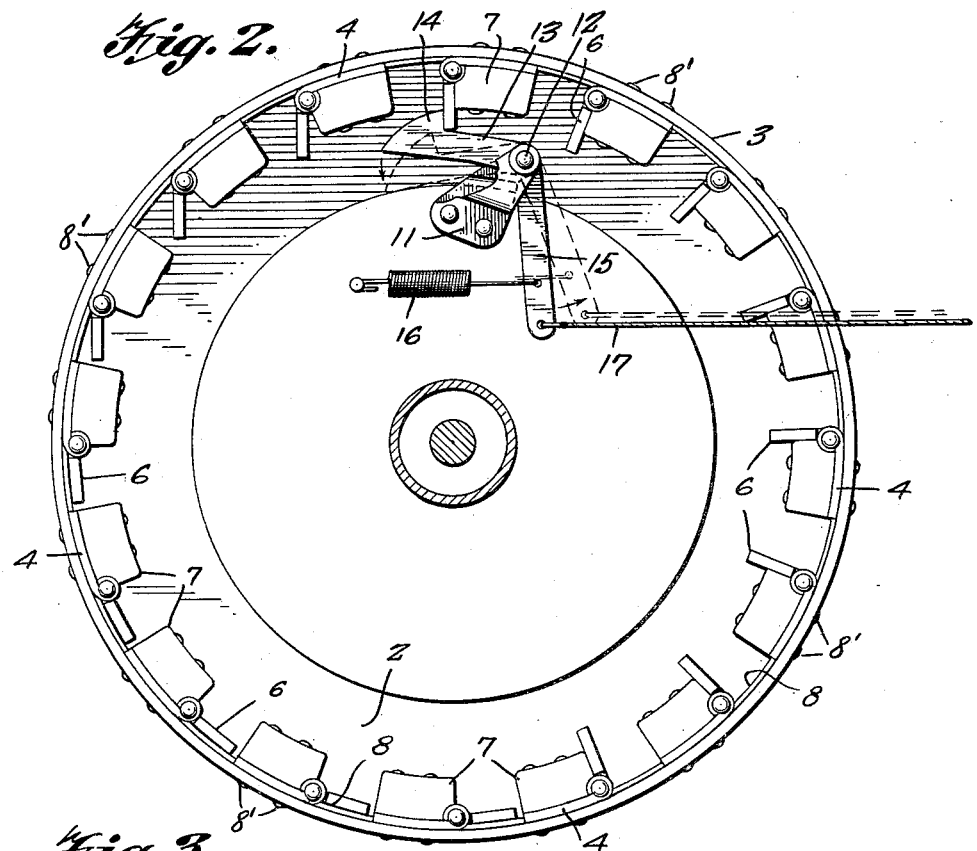
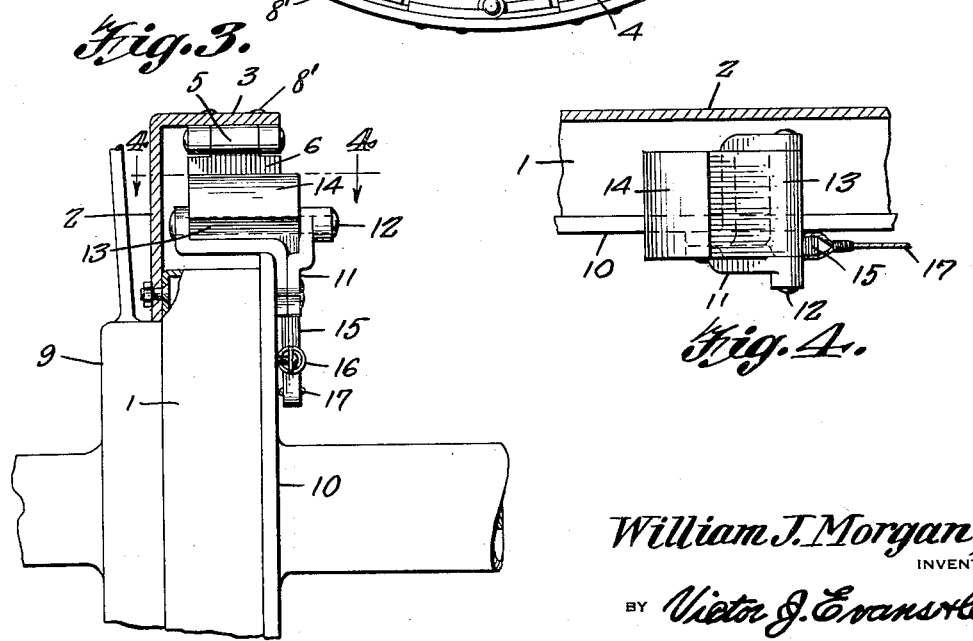
William J. Morgan, INVENTOR
BY Victor J. Evans & Co.
ATTORNEY Patented Sept. 12, 1933

1,926,955

UNITED STATES PATENT OFFICE 1,926,955

BRAKE

William J. Morgan, Oberlin, Pa., assignor of one-half to Cecil C. Hale, Enhaut, Pa.

Application March 7, 1932. Serial No. 597,311

3 Claims. (Cl. 192—4)

My present invention has reference to an appliance or attachment for motor driven vehicles and my object is the provision of simple means for preventing a vehicle from accidental movement in a rearward direction when the vehicle is ascending or is stopped on an incline.

A further object is the provision of a means for this purpose which is automatic in action.

A further object is the provision of a brake means of this character which will not interfere with the forward movement of the vehicle and which also will not interfere with the reversing of the vehicle when the reverse gears are thrown into mesh by the operator.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 1 is a top plan view of a sufficient portion of the running gear of a motor driven vehicle to illustrate the application of my improvement thereon.

Figure 2 is an enlarged sectional view approximately on the line 2—2 of Figure 1, looking in the direction of the arrows.

Figure 3 is an edge view of the improvement in applied position, parts being broken away and parts in section.

Figure 4 is a sectional view approximately on the line 4—4 of Figure 3, looking in the direction of the arrows.

Figure 5 is a detail sectional view to illustrate the manner in which the swingable blades or contact elements are supported on the rim or flange of the disc housing of the improvement.

Figure 6 is a perspective view of the dog.

Figure 7 is a similar view of one of the hinged contact elements or blade.

As disclosed especially by Figure 3 of the drawings I bolt or otherwise rigidly secure upon the upper face of one or both of the rear axle brake drums 1 of a motor driven vehicle, the disc which comprises the back element 2 of the housing of the improvement. The disc is provided with a peripheral flange 3 that is extended over but, of course, spaced from the periphery of the drum 1.

Riveted or otherwise rigidly secured at equidistantly spaced intervals in the flange 3 of the housing there are plates 4. One end of each of the plates 4 is rounded upon itself and the said rounded portions cut away to provide spaced barrels to receive therebetween and to have pivoted thereto a barrel 5 on the end of a swingable contact member 6. The members or elements 6 are also in the nature of flat plates and the plates 4 and 6 are shaped substantially similar to that of an ordinary butt hinge. Resting on each of the plates 4 there is a block of hard rubber or the like. These blocks are indicated by the numeral 7 and there is passed through the blocks and through the plates 4, as well as through the flange 3, securing elements preferably in the nature of double headed rivets 8'. The inner face of the flange 3 in the housing, between the blocks 7 is lined by compressible strips 8 for the plates 6 to engage when swung towards the flange 3 and by reference to Figure 5 of the drawings it will be noted that one of the corners of each of the stop blocks 7 is notched or cut away for the reception of the barrel or hinged connection between the plates 4 and 6 and likewise to permit of the plates 6 snugly contacting with one end of the block 7 when the plates gravitate thereagainst by the rotation of the wheel 9 which imparts a similar rotary movement to the drum 1.

Fixed on the top of the inner and non-rotatable closure plate or disc 10 for the drum 1 there is a bracket 11, and pivotally secured, as at 12, to the outer end of this bracket there is a strong metal member 13 whose outer or free end is formed with a dog 14. The dog describes an inner straight shoulder and an outer arched or rounded wall and the body 13 of the dog at its pivoted end portion is formed with an angularly disposed finger 15 having spaced openings therethrough. One of these openings is engaged by the end of a coiled compression spring 16 whose second end is fixed on the head or disc 10, while the second and lower opening receives therethrough one end of a flexible member 17 which is preferably in the nature of a strong wire, the said end of the wire being coiled around the body thereof. The second end of the element 17 is connected to the outer end of the short arm or lever 18 which is pivoted, as at 19, to a bracket 20 secured upon the under face of the transmission casing of the vehicle and the free end of this lever 19 is disposed directly opposite and in the path of contact with the counter shaft 21 for the reversing gears in the transmission case, when such gears are brought into mesh and the counter shaft 21 is projected through its bearings or through the rear end of the transmission casing 22.

As long as a vehicle travels in a straight ahead direction the curved end of the dog will slide under the outer edges of the contact plates 6. Should the vehicle stop upon an incline and should the brakes fail to hold, or even if the application of the brakes, when in good condition, is not sufficient to prevent the rearward and downward movement of the vehicle, a slight turning of the rear wheels in a reverse direction will bring one of the upper contact plates 6 to engage with the shoulder of the dog 14, which obviously will prevent accidental downward movement of the vehicle. As stated, the vehicle when propelled in a straight ahead direction will permit of the plates 6 merely sliding over the dog and when the vehicle is to be reversed and the counter shaft 21 of the reversing gears is projected as disclosed by Figure 1 of the drawings the said shaft will contact with the lever 18 to swing the same to exert a pull on the element 17 and the swinging of the dog to the dotted line position disclosed by Figure 2 of the drawings so that the vehicle can be reversed without interfering with my safety brake construction.

Having described the invention, I claim:

1. A device for preventing the accidental reverse movement of a vehicle, comprising a housing mounted for rotation with the rear axle brake drum of a vehicle, equidistantly spaced hinged plates in the housing, a buffer member for each plate for holding the said plates when moved thereagainst, and a pivotally mounted spring influenced dog arranged on a fixed support disposed adjacent to the top of the housing, over which the hinged plates travel when the vehicle is moved in a forward direction, and against which other of the plates contact should the vehicle accidentally travel in a reverse direction.

2. A device, according to claim 1, in which compressible strips are arranged between the buffers and in which the said buffers are of semi-compressible material.

3. A device for preventing the accidental movement of a motor driven vehicle in a reverse direction, comprising a flanged housing, which surrounds and is fixed on the rotary rear axle brake drum of a vehicle, equidistantly spaced hingedly connected plates, a block contacting one of the plates and being notched to receive the hinged connection between the plates therein and said blocks being secured to the plates and to the inner periphery of the housing, compressible strips arranged between the blocks, a bracket adjacent to the top of the fixed cover plate of the drum, a member pivotally secured to the bracket and having its free end provided with a dog which describes an inner straight shoulder and an outer rounded wall, an angle arm depending from the pivoted end of the member, a spring between the arm and drum head for swinging the lever in the direction of the housing and into the path of contact with the hinged plates.

WILLIAM J. MORGAN.